United States Patent
Faraday et al.

(10) Patent No.: US 7,453,474 B2
(45) Date of Patent: Nov. 18, 2008

(54) FLEXIBLY RESIZEABLE VECTOR GRAPHICS

(75) Inventors: Peter Faraday, Seattle, WA (US); Charles Robert Stoner, Seattle, WA (US); Joseph Stephen Beda, Seattle, WA (US); Kenneth Young, Sammamish, WA (US); Bo Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/611,120

(22) Filed: Jun. 30, 2003

(65) Prior Publication Data

US 2004/0263537 A1 Dec. 30, 2004

(51) Int. Cl.
*G09G 5/373* (2006.01)
*G06T 3/40* (2006.01)
(52) U.S. Cl. ...................... 345/660; 345/666
(58) Field of Classification Search ......... 345/660–671, 345/788, 799–801; 715/788, 799–801
See application file for complete search history.

(56) References Cited

U.S. PATENT DOCUMENTS

| | | | | | |
|---|---|---|---|---|---|
| 5,428,728 | A | * | 6/1995 | Lung et al. | 345/469 |
| 5,542,039 | A | * | 7/1996 | Brinson et al. | 715/800 |
| 5,642,476 | A | * | 6/1997 | Turner | 345/443 |
| 5,748,192 | A | * | 5/1998 | Lindholm | 345/649 |
| 6,608,631 | B1 | * | 8/2003 | Milliron | 345/647 |
| 2003/0001869 | A1 | * | 1/2003 | Nissen | 345/672 |

OTHER PUBLICATIONS

J.D. Foley and A. Van Dam, Fundamentals of Computer Interactive Graphics, 1982, Addison-Wesley Publishing Company, pp. 505-537.*
J.D. Foley, A. Van Dam, S.K. Feiner, and J.F. Hughes, Computer Graphics: Principle and Practices, Jul. 1997, Addison-Wesley Publishing Company, pp. 471-531.*
William M. Newman and Robert F. Sproull, Principles of Interactive Computer Graphics, 1979, McGraw-Hill Book Company, pp. 309-331.*
Greg J. Badros, jojada J. Tirtowidjojo, Kim Marriott, Bernd Meyer, Will Portnoy, Alan Borning, A Constraint Extension to Scatable Vector Graphics, Apr. 2001, Proceedings of the 10th international conference on World Wide Web www '01 Publisher: ACM Press, pp. 489-498.*
Greg J. Badros, Will Portnoy, Jeff Nichols, Alan Borning, A Constraint Extension to Scalable Vector Grahics, May 10, 2000, http://www.badros.com/greg/CSVG/index.html, pp. 1-10.*

(Continued)

*Primary Examiner*—Jeffery A. Brier
(74) *Attorney, Agent, or Firm*—Woodcock Washburn LLP

(57) ABSTRACT

Vector graphics may be flexibly resized. Pins are associated with vector graphics control points, and when a canvas is resized, the pin locations are scaled according to the canvas resizing, and the control points associated with the pin are scaled according to a different positioning scheme. Pins may be fixed in location relative to the pin location, or may scale only in one direction. Control points not associated with a pin are scaled according to the canvas resizing. Other embodiments allow regions to be defined, in which control points are governed by a different positioning scheme, or allow a grid lines to be drawn defining the canvas into slices, where each slice is assigned a specific positioning scheme.

52 Claims, 10 Drawing Sheets

OTHER PUBLICATIONS

Greg J. Badros, website titled CSVG: Constraint Scalaable Vector Graphics, May 10, 2000, http://www.badros.com/greg/CSVG/Index.html, 2 pages.*

Badros, G.J. et al., "A Constraint Extension to Scalable Vector Graphics", *International World Wide Web Conference, Proceedings of the 10th International Conference on World Wide Web*, 2001, 489-198.

Ngo, T. et al., "Accessible Amination and Customizable Graphics via Simplicial Configuration", *International Conference on Computer Graphics and Interactive Techniques, Proceedings of the 27th Annual Conference on Computer Graphics and Interactive Techniques*, 2000, 403-410.

* cited by examiner

| 1001 | 1002 | 1003 |
| --- | --- | --- |
| 1004 | 1005 | 1006 |
| 1007 | 1008 | 1009 |

*FIG. 1(a)*  PRIOR ART

| 1001 | 1002 | 1003 |
| --- | --- | --- |
| 1004 | 1005 | 1006 |
| 1007 | 1008 | 1009 |

*FIG. 1(b)*  PRIOR ART

FLEXIBLY RESIZEABLE VECTOR GRAPHICS

FIELD OF THE INVENTION

This invention relates in general to the field of computer graphics. More particularly, this invention relates to creating graphic content using vector graphics.

BACKGROUND OF THE INVENTION

Producers of graphic content for display using a computer system want to create rich graphics which can be resized for different uses. For example, designers of user interfaces need to create graphic objects such as a button which can be selected using a mouse click. Such a button may be used in a number of situations and may be given different areas to fill in different layouts. However, while changing sizes, it is desirable for the button to retain certain properties, to enhance the user interface experience.

Bitmap objects are used to represent graphical objects. Bitmaps describe the objects by laying out a pattern of dots which represent the graphical information. When bitmaps are used, one method for resizing a bitmapped object is to magnify or reduce the entire object. This has numerous drawbacks. First, using simple reduction or magnification, the relative dimensions of the object will not change when using simple magnification or reduction. If an object drawn which is 50 pixels high by 100 pixels wide and rectangular in shape is resized so that the height is 100 pixels, the dimension of the resulting object will be 100 pixels by 200 pixels. If the magnification or reduction technique used allows different magnification or reduction in different dimensions, the relative dimensions need not remain fixed. However, in this case, writing on the object or other details of the object will be distorted. The bitmapped object may pixelate when viewed at a large size. For example, if the bitmap of the object is a pixel map when displayed at one size, and the object is displayed at a larger size, jaggedness and other artifacts may be viewable.

Anther method for resizing a bitmapped object is to divide the object into nine separate portions. This technique creates what is known as a "nine grid button." The separation is performed by dividing the object with two horizontal and two vertical lines into nine areas. This is shown in FIGS. 1(*a*) and 1(*b*). In FIG. 1(*a*), object 1000 is pictured, divided into areas 1001 through 1009. Areas 1001, 1003, 1007, and 1009 are fixed. Thus, when the object is resized, as shown in FIG. 1(*b*), the size of these areas does not change. The heights of areas 1002 and 1008 are fixed, but their width changes, and the widths of areas 1004 and 1006 are fixed, but their height changes. The width and height of area 1005 both change. When an area is resized, the bitmap in the area is resized to fill the new size for that area.

There are a number of problems with this nine-grid bitmap technique. First, as before, the bitmaps used for the different areas may pixelate when viewed at high resolution. Second, the nine-grid bitmap technique restricts what regions can be scaled. Third, tiling bitmaps reduces the graphic appeal of the control.

Vector graphics can also be used to create graphic content. In vector graphics, instead of a bitmap, the graphical information is stored as geometrical formulas which represent images. Vector graphics images are more flexible than bitmaps because they can be resized and stretched without pixellation effects. Additionally, images stored as vectors look better on higher-resolution devices, whereas bitmapped images always appear the same regardless of a device's resolution. Vector graphics objects may also require less memory to store a representation of an image than bitmapped objects.

However, no existing tools allow vector graphics to be authored in a way which allows some parts of the image or some regions of the image to scale while others will remain fixed. In general, for user interfaces which use vector graphics to create elements of the display, a rectangular border which is rendered by default from the system is used. However, this is not flexible or visually appealing.

Thus, there is a need to enable flexible rendering of a vector graphic object where different elements or regions of the image will resize differently when the object is resized.

SUMMARY OF THE INVENTION

Systems and methods are presented for allowing the creation of an image using vectors where the image may be partitioned into regions, and where the regions respond differently to resizing. This allows the creation of vector-based images which can be selectively scaled when resized. Additionally, if a region in an object is expanded, for example, when more text is added, or additional graphical information is added, the image may be scaled. The regions within the image will correctly expand when the image is expanded. Multiple regions in an image may be linked by constraints, which indicate, for example, how one region should respond when it is scaled from the outside by a neighbor region growing or shrinking. Conventional graphics tools may be used to create the images, and a run-time format is provided which can render the vector content.

In one embodiment, pins are used to allow differential sizing within a vector graphic. In conventional vector scaling, a canvas or drawn region contains vectors which are defined using points on the canvas. The points of the vectors scale when the canvas is scaled. This scaling occurs in a uniform way across the entire canvas and all points contained therein. One embodiment of the invention allows the placement of pins on the canvas. These pins are locations on the canvas. When points used in vectors are associated with a pin, they remain a fixed distance from the pin, even when the canvas is scaled. In another embodiment, when a point is associated with a pin on the canvas, the relationship between the point and the pin is specified. This relationship may include: allowing scaling in one dimension from the pin, but not in another dimension, allowing scaling only up to a certain maximum or down to a certain minimum, or allowing scaling according to a specified function of the scaling of the rest of the image, among others.

Another embodiment allows the creation of regions with constraints applied between the regions. A user can specify a region on a canvas or drawn region. In one embodiment, the selected regions do not scale when the image is scaled.

In another embodiment, a grid is created using grid lines, which divides the canvas into slices. A selection can be made for each slice which indicates, for each slice specified, whether the region scales or is fixed in a specific dimension. In another embodiment, the selection allows scaling only up to a certain maximum or down to a certain minimum, or allows scaling according to a specific function of the scaling of the rest of the image. This allows the drawn content to scale both when the external size of the canvas changes, and also to scale from within when regions scale. This internal scaling is accomplished using the constraints between regions of the grid.

In anther embodiment, multiple techniques are combined. A vector control point will scale when the point is pinned and the pin is scaled. While pinned control points are scaled according to their pin, an unpinned control point is scaled according to the region or slice it is in, if it is in a region or slice.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 1(a) and 1(b) are diagrams of an exemplary prior art bitmap resizing scheme.

DETAILED DESCRIPTION OF ILLUSTRATIVE EMBODIMENTS

Exemplary Computing Environment

Figure 2:
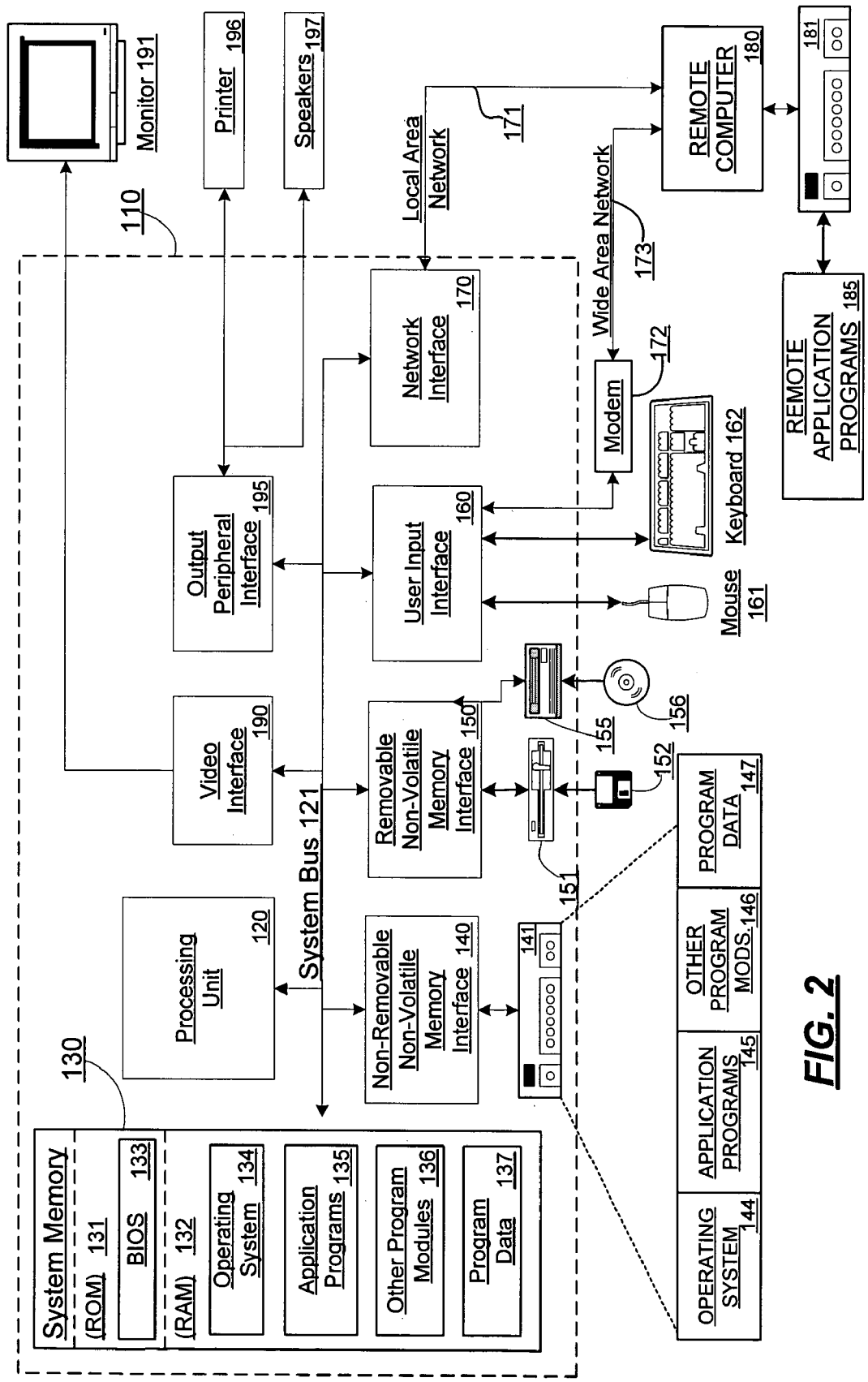
FIG. 2 is a block diagram of an exemplary computing environment in which aspects of the invention may be implemented.

FIG. 2 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Vector Graphics

As described above, in a vector graphic the graphical information is stored as geometrical formulas which represent images. Vector graphics images are more flexible than bitmaps because they can be resized and stretched without pixellation effects. The present invention allows flexible resizing of vector graphics. These flexibly-resized vector graphics may be combined with bitmap images to form composite images. A vector graphic image may incorporate a bitmap image as a component. One way to do this is to set the four edge points of the vector graphic as vector control points.

The canvas containing the image may be resized by scaling the canvas up or down. This scaling may involve proportional scaling up or down in both the x-dimension and the y-dimension. The canvas may also be rescaled only in one dimension, or to different proportions in the x-dimension and the y-dimension. Additionally, rescaling of the canvas may occur when content within the image is rescaled. For example, as described below, according to the invention regions and slices may be defined within a vector graphic. When the size of the region or slice is changed, the constraints on interrelationships within the image may cause other items in the image to be resized, or may cause the resizing of the entire image.

Use of Pins and Control Points to Implement Flexibly Resizable Vector Graphics

Figure 3A:
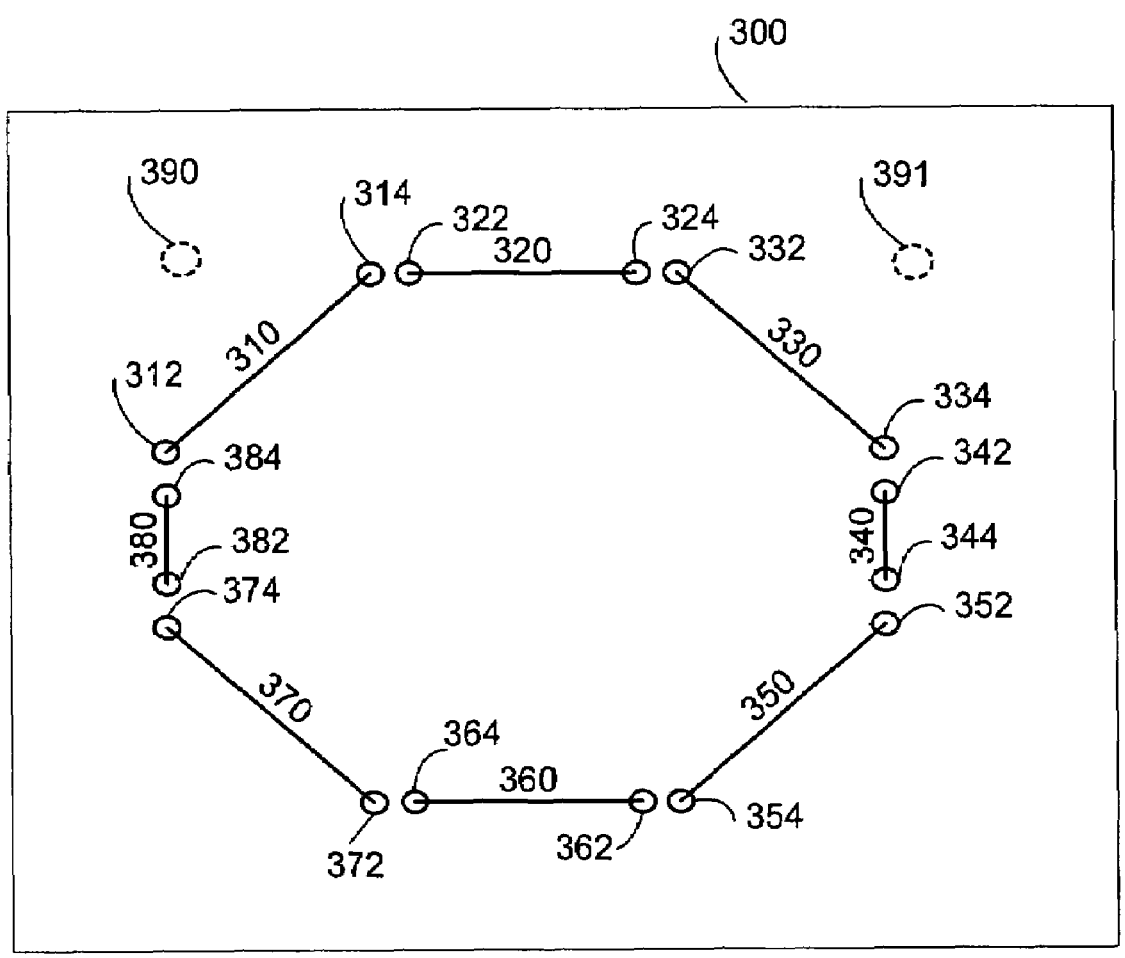
FIGS. 3(a) and 3(b) are diagrams of a vector graphics drawing according to one embodiment of the invention, before and after resizing.
Figure 3B:
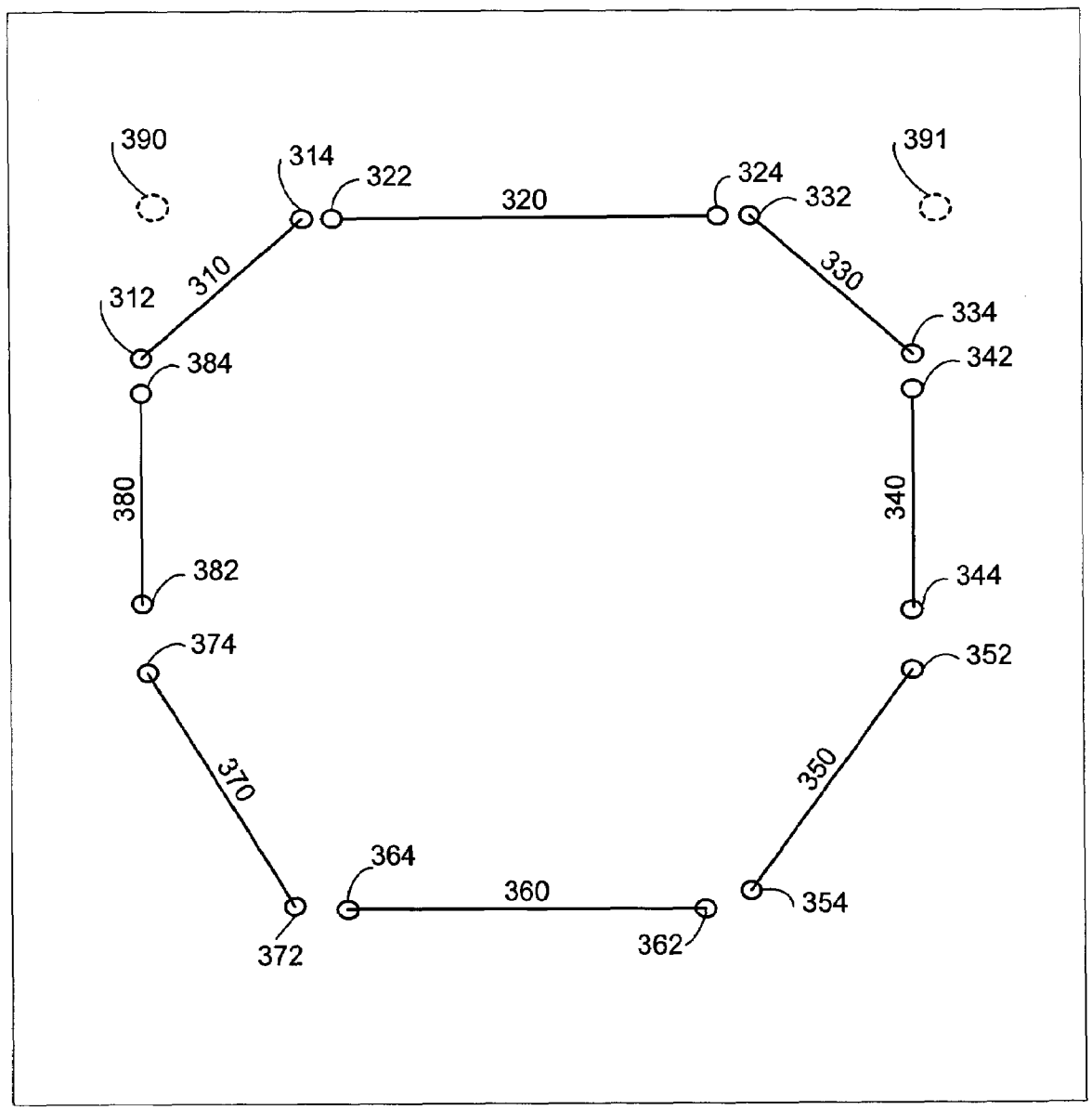

FIGS. 3(a) and 3(b) are exemplary vector graphics drawings that are useful in describing aspects of the present invention. As shown in FIG. 3(a), on canvas 300, vectors 310, 320, 330, 340, 350, 360, 370, and 380 have been drawn. Vector 310 is a line drawn between control point 312 and control point 314. Similarly, vector 320 is drawn between control points 322 and 324, vector 330 between control points 332 and 334, vector 340 between control points 342 and 344, vector 350 between control points 352 and 354, vector 360 between control points 362 and 364, vector 370 between control points 372 and 374, and vector 380 between control points 382 and 384. While lines have been shown, vectors describing other objects and shapes may be included on a canvas, including characters in a vector font, and Bezier curves.

Also shown on canvas 300 are pins 390 and 391. In this example, assume that pin 390 is associated with control points 384, 312, 314, and 322 and pin 391 is associated with control points 324, 332, 334, and 342. The association, in this case, is that the control points associated with a pin must remain fixed in location with respect to the pin. When canvas 300 is resized, as shown in FIG. 3(b), the vector 310 does not change size, because both of its control points 312 and 314 are fixed with respect to pin 390. Similarly, vector 330 does not change size. However, vectors 350, 360, and 370 have been stretched, because the control points defining them were not subject to an association with any pin. In addition, vectors 380 and 340 have been stretched, because only one control point in each vector is associated with a pin. Vector 320 has also been stretched—while both of its control points 322 and 324 are associated with pins, they are associated with different pins. While control points must remain fixed in location with respect to the pin they are pinned to, the pins may move with respect to each other. When the canvas 300 is re-sized, all of the pins are scaled so that they remain in proportion with the canvas. Each of the points that are not pinned are similarly scaled. All pinned points are kept at a fixed distance from their pin.

In another embodiment, other effects of the association of a control point with a pin may be specified. One such effect may be to allow scaling in one dimension from the pin, but not in another dimension. If this effect is selected for an association of a control point with a pin, the distance between the pin and the control point may change, but only by movement in one dimension. In another embodiment, a minimum or maximum may be set for a control point and a pin, and the distance between the control point and the pin is governed by that minimum or maximum. In one embodiment, the minimum or maximum is absolute, meaning an absolute distance. For example, in the case of a maximum, the control point and the pin should never be farther from each other than the absolute distance specified. In another embodiment, the minimum or maximum is relative, meaning that, for example, the control point and the pin should never be more than a relative distance (e.g., twice the distance) that they originally were from each other before resizing occurred.

In one embodiment, scaling between a control point and a pin occurs according to a specified function of the scaling of the rest of the image. For example, if $S_x$ is the scaling applied to the canvas in the x-dimension, and $S_y$ is the scaling applied to the canvas in the y-dimension, then the scaling between a control point and a pin is given by two functions $f_x(S_x)$ (for the scaling in the x-dimension) and $f_y(S_y)$ (for the scaling in the y-dimension). In another embodiment, the function defining the scaling in one dimension may be related to the scaling in both dimensions—in this case, the scaling in the x-dimension may be a function $f_x(S_x, S_y)$ and the scaling in the y-dimension may be a function $f_y(S_x, S_y)$.

Figure 4:
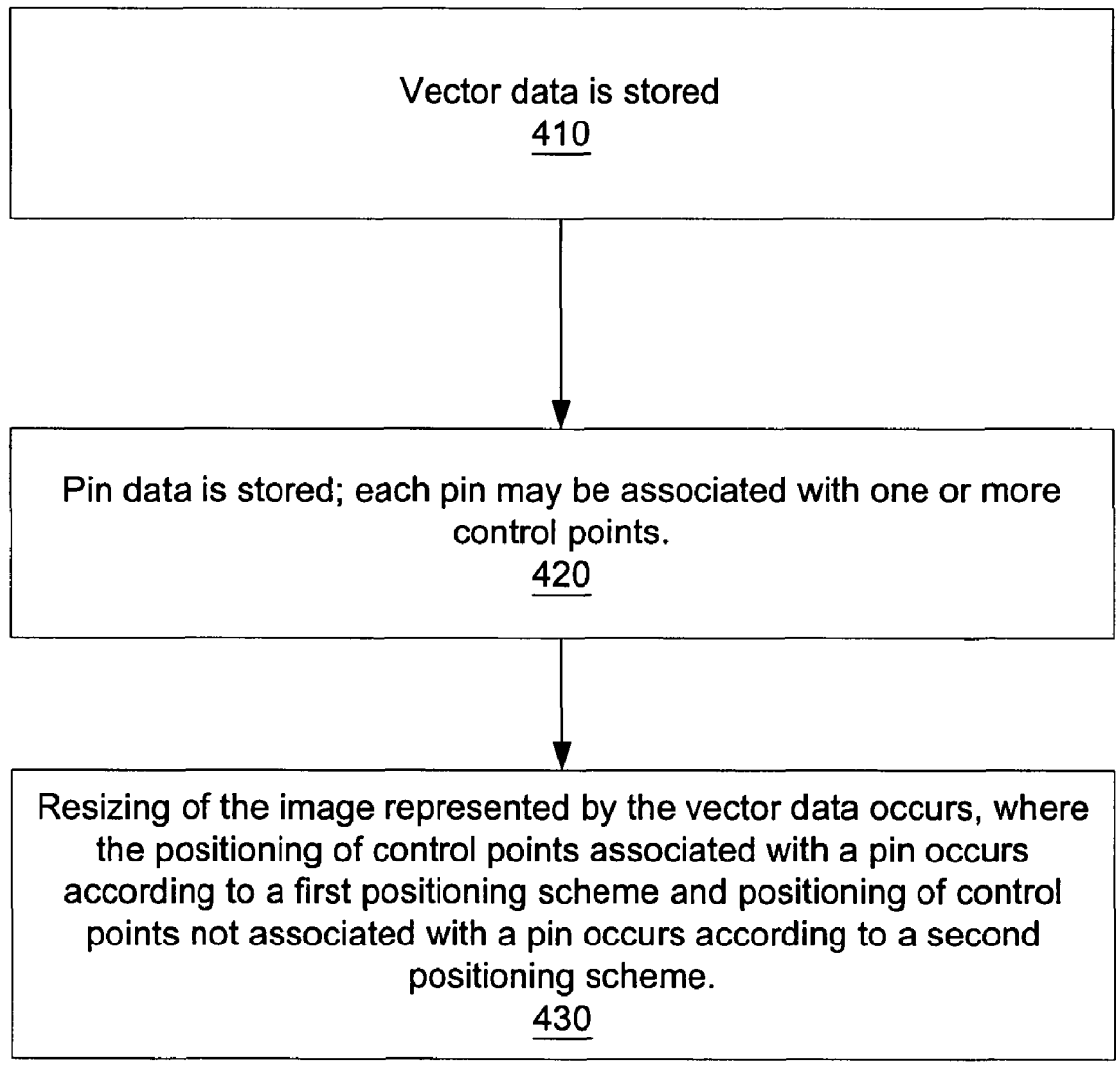
FIG. 4 is a flow diagram of an exemplary process by which resizing takes place according to one embodiment of the invention.
Figure 5A:
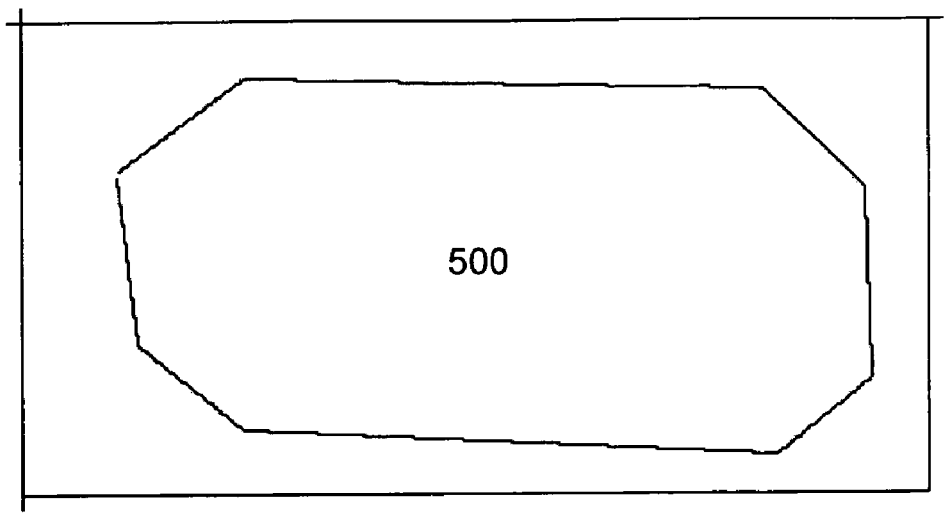
FIGS. 5(a) and 5(b) are diagrams of a vector graphics drawing according to one embodiment of the invention.
Figure 5B:
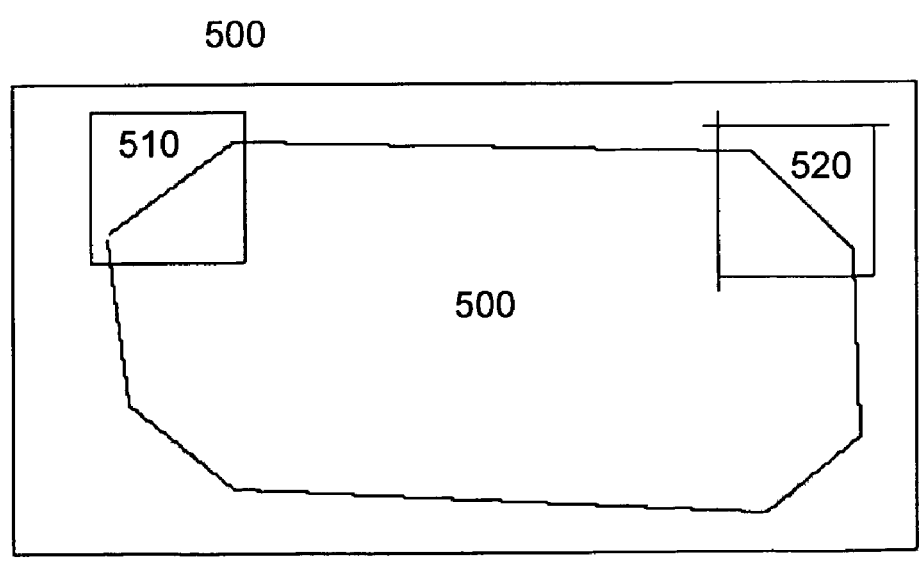
Figure 5C:
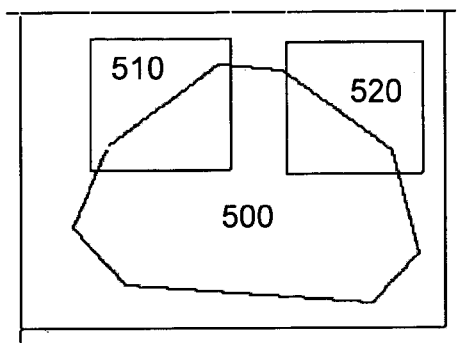
FIGS. 5(c) and 5(d) are diagrams reflecting the resizing of the vector graphics drawing depicted in FIGS. 5(a) and 5(b) according to one embodiment of the invention.
Figure 5D:
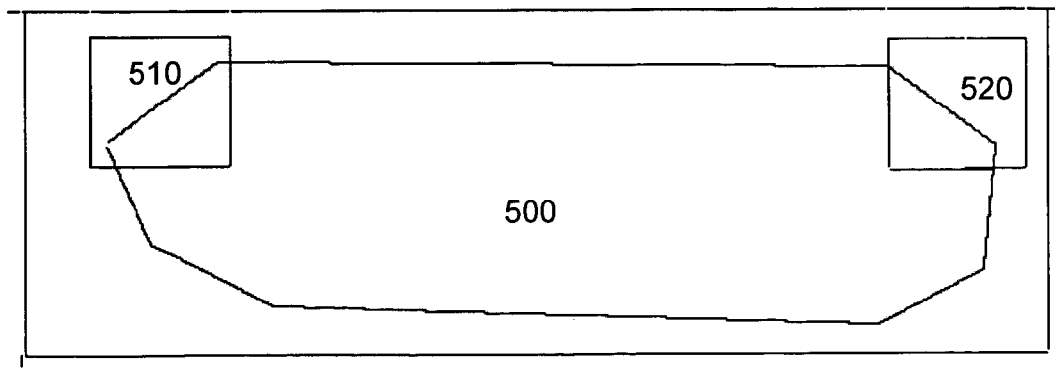
Figure 5E:
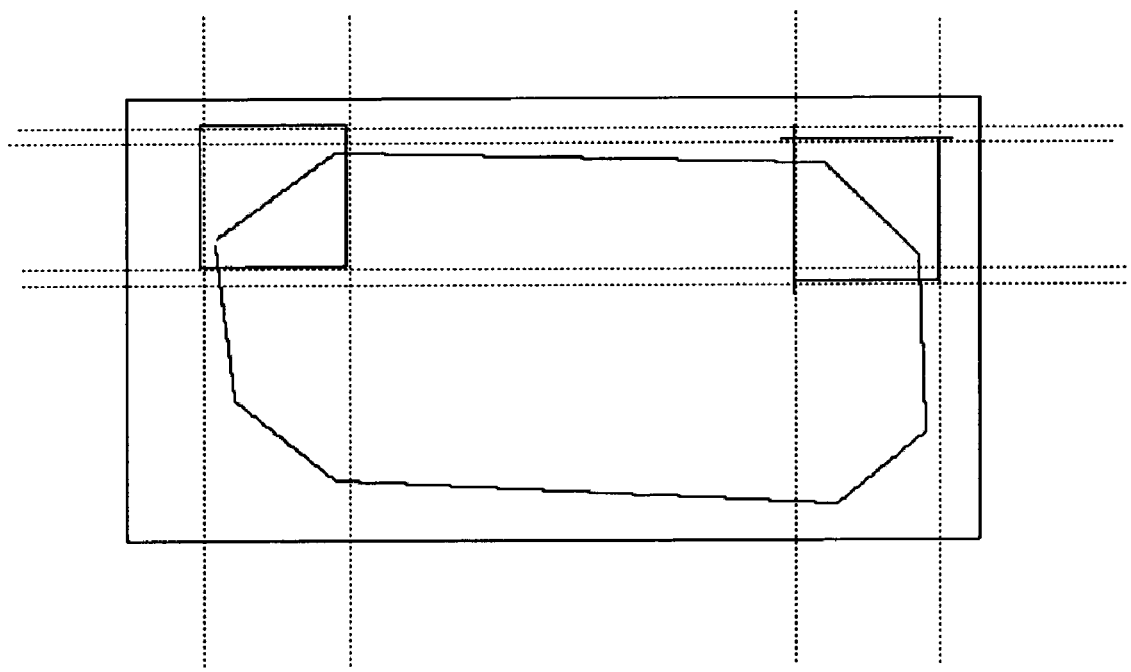
FIG. 5(e) is a diagram of a vector graphics drawing according to one embodiment of the invention.

FIG. 4 is a flow diagram of an exemplary process by which resizing takes place according to one embodiment of the invention. As shown in FIG. 4, in one embodiment, vector data, which had been previously created, is stored, step 410. This vector data may be created by a user, via a user tool or application. Vector data may also be created by copying from previously existing vector data, or by performing some operation on existing non-vector data. This vector data comprises at least one control point. Once vector data is created, pin data is created for at least one pin and stored, step 420. This pin data is associated with at least one control point in the vector data. In step 430, resizing of the image represented by the vector data occurs, where positioning of control points associated with a pin occurs according to a first positioning scheme.

In one embodiment, the first positioning scheme causes the control points associated with a pin to stay in a fixed position with relation to the pin. Other embodiments with other positioning schemes are described herein, including a scheme in which the relative positions of the pin and the control point are fixed in one dimension. Positioning of control points not associated with a pin occurs according to a second positioning scheme. Where resizing from a first size to a second size has been requested, the second positioning scheme desirably positions control points not associated with a pin in accordance with the change in size. In one embodiment, pins may also act as control points for their pinned areas. In this embodiment, several control points may be pinned to a first pin. The first pin (and possibly other pins and other control points) is pinned to a second pin. The positioning of the second pin occurs according to the first positioning scheme, while the position of the first pin is based on the positioning of the second pin, as if the first pin were a control point. The positioning of the pins pinned to the first pin is then set relative to the first positioning scheme.

Use of Regions to Implement Flexibly Resizable Vector Graphics

Regions may also be used to implement flexibly resizable vector graphics. After the vectors have been placed on the canvas, regions can be defined. Regions may include tables such as those used in other environments, such as web pages, for layouts. FIGS. 5(*a*)-5(*e*) are diagrams of exemplary vector graphics drawings in accordance with the present invention. As shown in FIG. 5(*a*), shape 500 has been drawn using vector graphics, created from simple line primitives. As shown in FIG. 5(*b*), two regions 510 and 520 are defined. As shown in FIGS. 5(*c*) and 5(*d*), in one embodiment, when the drawing is scaled, the relative locations of control points within the defined regions remain fixed, while the relative locations of control points which are not contained within one of the defined regions change. The location of the regions is governed by the scaling of the canvas. Thus, the locations of the regions with respect to each other also change when the canvas is resized.

Figure 6:
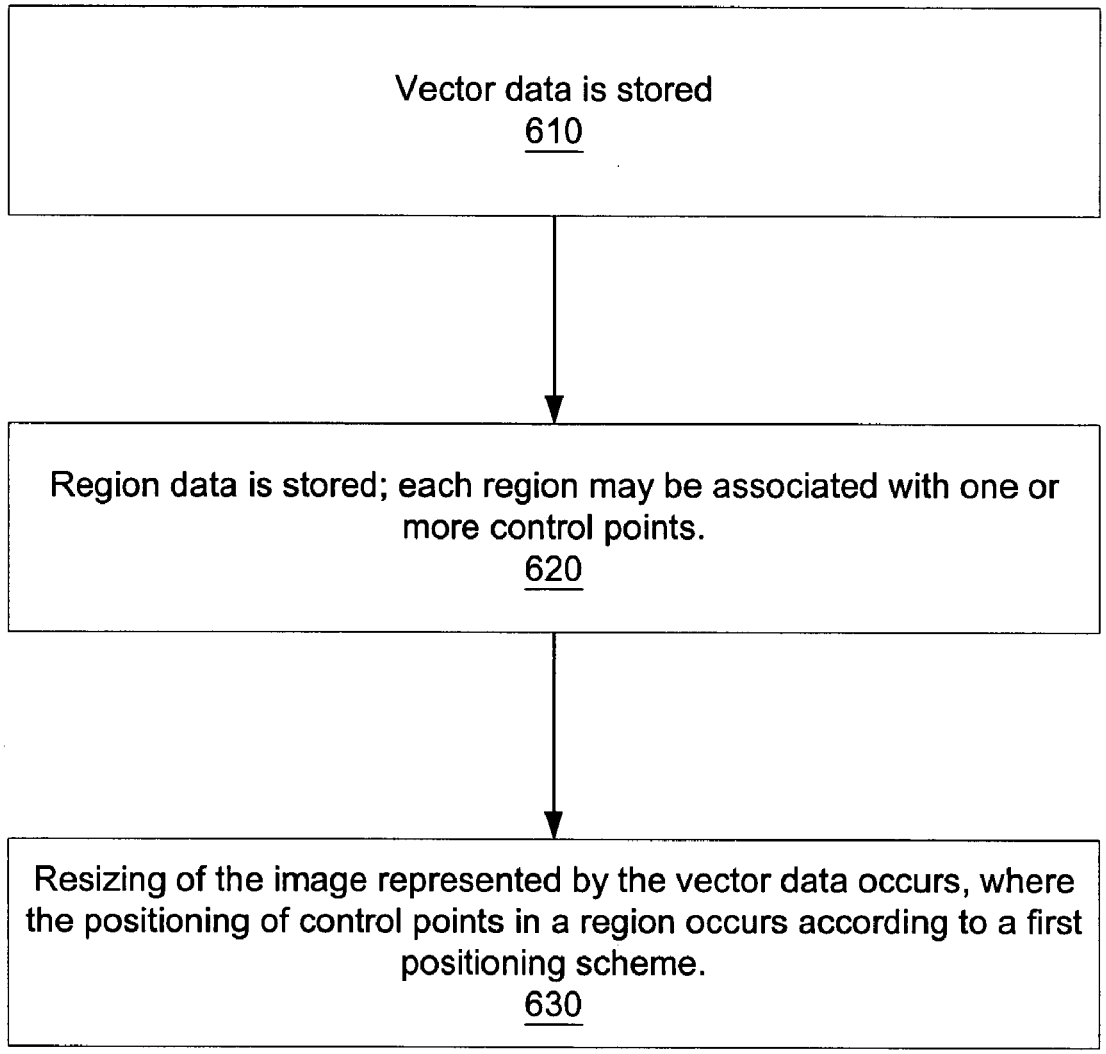
FIG. 6 is a flow diagram of an exemplary process by which resizing takes place according to one embodiment of the invention.

In another embodiment, the scaling within the region is fixed only in one dimension. In one example of this embodiment, while the width of the region does not change when the canvas is scaled, the height of the region does change. In another example, the height of the region does not change, but the width of the region does change. Similar to the relationship between a pin and the control points it is pinned to, in other embodiments the scaling of the region is done according to a prespecified formula. In this way a first positioning scheme is used to position control points within a region, and a second positioning scheme is used outside of the region. The second positioning scheme also governs the location of the region. FIG. 6 is a flow diagram of an exemplary process in accordance with the present invention. As shown in FIG. 6, vector data is stored, step 610. As discussed above, this vector data may be created by a user, via a user tool or application, may be created by copying from previously existing vector data, or by performing some operation on existing non-vector data. This vector data comprises at least one control point. Once vector data is created, region data is created for at least one region, step 620. This region data is associated with at least two or more control points in the vector data. In step 630, resizing of the image represented by the vector data occurs, where positioning of control points within a region occurs according to a first positioning scheme.

In one embodiment, the control points in the region stay in a fixed position with relation to each other. Other positioning schemes may be used, including a scheme in which the relative positions of the control points are fixed in one dimension but scale in the other dimension. Positioning of control points not located within a region desirably occurs according to a second positioning scheme. Where resizing from a first size to a second size has been requested, the second positioning scheme preferably positions control points not associated with a region in accordance with the change in size.

Use of Grid Lines to Implement Flexibly Resizable Vector Graphics

In another embodiment, the specification of one or more regions on a canvas creates a grid, as shown in FIG. 5(*e*). In another embodiment, the grid is created by assigning grid lines. The horizontal grid lines divide the canvas into horizontal slices and the vertical grid lines divide the canvas into vertical slices. For each of these slices, a selection can be made of a positioning scheme to use. In one embodiment, the positioning scheme is either fixed or proportional to the rescaling. Each slice is either set to be fixed ("locked") or proportional to the resealing ("unlocked"). A horizontal slice that is locked will not be rescaled to be wider or narrower in the vertical extent. A vertical slice that is locked will not be rescaled to be wider or narrower in the horizontal extent.

In another embodiment, one or more other positioning schemes may be assigned to the slices. A maximum or minimum extent may be set, for example, or scaling may be performed according to a specific function of the scaling of the rest of the canvas.

In one embodiment, regions or slices may be scaled by a user separately from the rest of the image. With the exception of the region or slice scaled, positioning rules are maintained, and in this way, the drawn content scales both (1) when the external size of the canvas changes, and (2) from within, when regions or slices scale.

Figure 7:
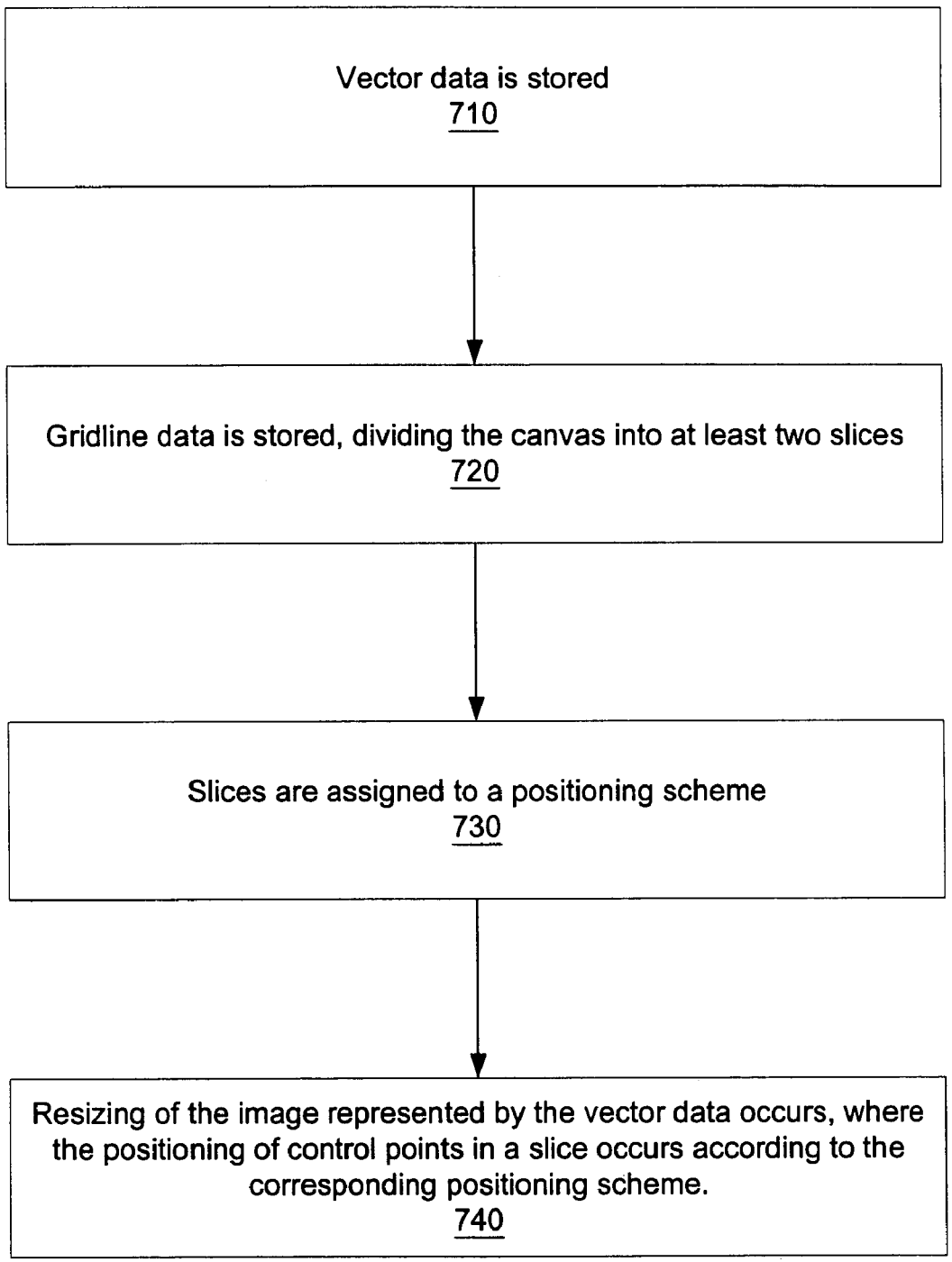
FIG. 7 is a flow diagram of an exemplary process by which resizing takes place according to one embodiment of the invention.

FIG. 7 is a flow diagram of another exemplary process in accordance with the present invention. As shown in FIG. 7, vector data is stored, step 710. Again, the vector data may be created, copied, or modified, as set forth above, for example. This vector data comprises at least one control point. Once vector data is created, at least one gridline is created, thereby dividing the canvas into at least two slices, step 720. In step 730, each slice is assigned to a positioning scheme (e.g., either a first or a second positioning scheme). In step 740, resizing of the image represented by the vector data occurs, where positioning of control points within each slice occurs according to the corresponding positioning scheme.

Grid lines need not be straight lines. A grid line, for example, may be a curved line drawn freehand by a user or with a user tool. Additionally, since grid lines need not be parallel, control points may reside in more than one slice. In one embodiment, if a control point is associated with one horizontal slice and one vertical slice, a conflict resolution procedure is desirably used. In one embodiment, the least restrictive positioning scheme is used for a control point associated with two or more slices with different positioning schemes. For example, consider a control point resident in two slices. The first slice uses a positioning scheme which calls for control points to be fixed with respect to other control points in the slice. The second slice uses a second positioning scheme which calls for control points to be located as traditional resizing would locate them. Because the second positioning scheme is more flexible, a control point resident in both slices would use the second scheme, and be resized with respect to the canvas rather than remaining fixed along with other fixed control points.

Grid lines may be used to create a layout table. Such a table is created by dividing the vector graphics image horizontally and vertically with grid lines, with the slices forming what may be thought of as the rows and columns of the table. Vector graphics images may span one or more rows and one or more columns. For example, a control point for a vector is located in one slice, corresponding to a row $R_1$ and a second control point for the same vector is located in a different slice, corresponding to a row $R_2$. In this example case, the vector spans multiple rows. A vector may also span multiple columns, or multiple rows and columns at the same time. Rather than anchoring a complete object to a location in a table, therefore, an object may span two or more rows and/or columns in the table, and the appearance of the object may be governed by more than one positioning schecme. Additionally, different objects can overlap, without the loss of positioning information.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for flexibly resizing an image comprising a vector graphics component, comprising:
    storing vector data comprising at least one control point, each control point corresponding to a location, said vector data representing said vector graphics component;
    storing pin data regarding at least one pin, the pin data comprising, for each of said pins, a pin location and an association with at least one associated control point of the at least one control point, the association comprising one of location information between the pin and each of the at least one associated control point, scaling information between the pin and each of the at least one associated control point, and distance information between the pin and each of the at least one associated control point;
    resizing said vector graphics component where a new position for each control point associated with one of said pins is determined according to a first positioning scheme, and where a new position for said associated pin location is determined according to a second positioning scheme; and
    displaying the resized vector graphics component on a display device.

2. The method of claim 1, where said step of resizing said vector graphics component comprises determining a new position for control points not associated with any of said pins according to said second positioning scheme.

3. The method of claim 1, where said first positioning scheme comprises maintaining the locations of said control points associated with one of said at least one pin in the same relative location to said associated pin location.

4. The method of claim 1, where said first positioning scheme comprises maintaining the locations of said control points associated with one of said at least one pin in the same relative location in one dimension to said associated pin location, and changing the location of said control points associated with one of said at least one pin according to said second positioning scheme in a second dimension.

5. The method of claim 1, where said first positioning scheme includes a maximum distance value, and where according to said first positioning scheme, the location of said control points associated with one of said at least one pin in relation to said associated pin location is limited by said maximum distance value.

6. The method of claim 1, where said first positioning scheme includes a minimum distance value, and where according to said first positioning scheme, the location of said control points associated with one of said at least one pin in relation to said associated pin location is limited by said minimum distance value.

7. The method of claim 1, where said first positioning scheme is a function of said second positioning scheme.

8. The method of claim 1, where said second positioning scheme comprises a resizing scheme which changes positions of control points based on the resizing of a canvas area.

9. A computing device configured to perform the steps of:
storing vector data comprising at least one control point, each control point corresponding to a location, said vector data representing said vector graphics component;
storing pin data regarding at least one pin, the pin data comprising, for each of said pins, a pin location and an association with at least one associated control point of the at least one control point, the association comprising one of location information between the pin and each of the at least one associated control point, scaling information between the pin and each of the at least one associated control point, and distance information between the pin and each of the at least one associated control point;
resizing said vector graphics component where a new position for each control point associated with one of said pins is determined according to a first positioning scheme, and where a new position for said associated pin location is determined according to a second positioning scheme; and
displaying the resized vector graphics component on a display device.

10. A method for flexibly resizing an image comprising a vector graphics component, comprising:
storing vector data comprising at least one control point, each control point corresponding to a location, said vector data representing said vector graphics component;
storing region data regarding at least one region, the region data comprising, for each of said regions, a region area, where each region is associated via an association with all of said control points which are located within said region area for the region, the association comprising one of location information between the region and each of the control points, scaling information between the region and each of the control points, and distance information between the region and each of the control points;
resizing said vector graphics component where a new position for each control point associated with one of said regions is determined according to a first positioning scheme, and where a new position for said region area is determined according to a second positioning scheme; and
displaying the resized vector graphics component on a display device.

11. The method of claim 10, where said step of resizing said vector graphics component comprises: determining a new position for control points not associated with any of said at least one regions according to said second positioning scheme.

12. The method of claim 10, where said first positioning scheme comprises maintaining the locations of said control points associated with one of said at least one region in the same relative location to each other.

13. The method of claim 10, where said first positioning scheme comprises maintaining the locations of said control points associated with one of said at least one region in the same relative location to each other in one dimension, and changing the relative locations of said control points associated with one of said at least one region according to said second positioning scheme in a second dimension.

14. The method of claim 10, where said first positioning scheme includes a maximum distance value, and where according to said first positioning scheme, the relative location of said control points associated with one of said at least one region is limited by said maximum distance value.

15. The method of claim 10, where said first positioning scheme includes a minimum distance value, and where according to said first positioning scheme, the relative location of said control points associated with one of said at least one region is limited by said minimum distance value.

16. The method of claim 10, where said first positioning scheme is a function of said second positioning scheme.

17. The method of claim 10, where said second positioning scheme comprises a resizing scheme which changes positions of regions based on the resizing of a canvas area.

18. A computing device configured to perform the steps of:
storing vector data comprising at least one control point, each control point corresponding to a location, said vector data representing said vector graphics component;
storing region data regarding at least one region, the region data comprising, for each of said regions, a region area, where each region is associated via an association with all of said control points which are located within said region area for the region, the association comprising one of location information between the region and each of the control points, scaling information between the region and each of the control points, and distance information between the region and each of the control points;
resizing said vector graphics component where a new position for each control point associated with one of said regions is determined according to a first positioning scheme, and where a new position for said region area is determined according to a second positioning scheme; and
displaying the resized vector graphics component on a display device.

19. A method for flexibly resizing an image comprising a vector graphics component, comprising:
storing vector data comprising at least one control point, each control point corresponding to a location, said vector data representing said vector graphics component;
storing gridline data dividing said vector graphics component into two or more slices, where each of said control points is associated with a corresponding one of said slices via an association, the association comprising one of location information between the slices and each of the control points, scaling information between the slices and each of the control points, and distance information between the slices and each of the control points;
assigning at least one of said slices to a first positioning scheme and at least one of said slices to a second positioning scheme;
resizing said vector graphics component where a new position for each control point associated with said slices assigned to said first positioning scheme is determined according to said first positioning scheme, and where a new position for each of said control points associated with said slices assigned to said second positioning scheme is determined according to said second positioning scheme; and
displaying the resized vector graphics component on a display device.

20. The method of claim 19, where said first positioning scheme for a given slice comprises maintaining the locations of said control points associated with said given slice in the same relative location to each other.

21. The method of claim 19, where said first positioning scheme for a given slice comprises maintaining the locations of said control points associated with said given slice in the same relative location to each other in one dimension, and changing the relative locations of said control points associated with said given slice according to said second positioning scheme in a second dimension.

22. The method of claim 19, where said first positioning scheme for a given slice includes a maximum distance value, and where according to said first positioning scheme, the relative location of said control points associated with said given slice is limited by said maximum distance value.

23. The method of claim 19, where said first positioning scheme for a given slice includes a minimum distance value, and where according to said first positioning scheme, the relative location of said control points associated with said given slice is limited by said minimum distance value.

24. The method of claim 19, where said first positioning scheme is a function of said second positioning scheme.

25. The method of claim 19, where said second positioning scheme comprises a resizing scheme which changes positions of control points based on the resizing of a canvas area.

26. A computing device configured to perform the steps of:
storing vector data comprising at least one control point, each control point corresponding to a location, said vector data representing said vector graphics component;
storing gridline data dividing said vector graphics component into two or more slices, where each of said control points is associated with a corresponding one of said slices via an association, the association comprising one of location information between the slices and each of the control points, scaling information between the slices and each of the control points, and distance information between the slices and each of the control points;
assigning at least one of said slices to a first positioning scheme and at least one of said slices to a second positioning scheme;
resizing said vector graphics component where a new position for each control point associated with said slices assigned to said first positioning scheme is determined according to said first positioning scheme, and where a new position for each of said control points associated with said slices assigned to said second positioning scheme is determined according to said second positioning scheme; and
displaying the resized vector graphics component on a display device.

27. A system for flexibly resizing an image comprising a vector graphics component, comprising:
vector data storage for storing vector data comprising at least one control point, each control point corresponding to a location, said vector data representing said vector graphics component;
pin data storage for storing pin data regarding at least one pin, the pin data comprising, for each of said pins, a pin location and an association with at least one associated control point of the at least one control point, the association comprising one of location information between the pin and each of the at least one associated control point, scaling information between the pin and each of the at least one associated control point, and distance information between the pin and each of the at least one associated control point;
vector graphics recalculator for resizing said vector graphics component where a new position for each control point associated with one of said pins is determined according to a first positioning scheme, and where a new position for said associated pin location is determined according to a second positioning scheme; and
a display device for displaying the resized vector graphics component.

28. The system of claim 27, where said vector graphics recalculator comprises determining a new position for control points not associated with any of said pins according to said second positioning scheme.

29. The system of claim 27, where said first positioning scheme comprises maintaining the locations of said control points associated with one of said at least one pin in the same relative location to said associated pin location.

30. The system of claim 27, where said first positioning scheme comprises maintaining the locations of said control points associated with one of said at least one pin in the same relative location in one dimension to said associated pin location, and changing the location of said control points associated with one of said at least one pin according to said second positioning scheme in a second dimension.

31. The system of claim 27, where said first positioning scheme includes a maximum distance value, and where according to said first positioning scheme, the location of said control points associated with one of said at least one pin in relation to said associated pin location is limited by said maximum distance value.

32. The system of claim 27, where said first positioning scheme includes a minimum distance value, and where according to said first positioning scheme, the location of said control points associated with one of said at least one pin in relation to said associated pin location is limited by said minimum distance value.

33. The system of claim 27, where said first positioning scheme is a function of said second positioning scheme.

34. The system of claim 27, where said second positioning scheme comprises a resizing scheme which changes positions of control points based on the resizing of a canvas area.

35. A system for flexibly resizing an image comprising a vector graphics component, comprising:
vector data storage for storing vector data comprising at least one control point, each control point corresponding to a location, said vector data representing said vector graphics component;
region data storage storing region data regarding at least one region, the region data comprising, for each of said regions, a region area, where each region is associated via an association with all of said control points which are located within said region area for the region, the association comprising one of location information between the region and each of the control points, scaling information between the region and each of the control points, and distance information between the region and each of the control points;
vector graphics recalculator resizing said vector graphics component where a new position for each control point associated with one of said regions is determined according to a first positioning scheme, and where a new position for said region area is determined according to a second positioning scheme; and
a display device for displaying the resized vector graphics component.

36. The system of claim 35, where vector graphics recalculator comprises:
determining a new position for control points not associated with any of said at least one regions according to said second positioning scheme.

37. The system of claim 35, where said first positioning scheme comprises maintaining the locations of said control points associated with one of said at least one region in the same relative location to each other.

38. The system of claim 35, where said first positioning scheme comprises maintaining the locations of said control points associated with one of said at least one region in the same relative location to each other in one dimension, and changing the relative locations of said control points associated with one of said at least one region according to said second positioning scheme in a second dimension.

39. The system of claim 35, where said first positioning scheme includes a maximum distance value, and where according to said first positioning scheme, the relative location of said control points associated with one of said at least one region is limited by said maximum distance value.

40. The system of claim 35, where said first positioning scheme includes a minimum distance value, and where according to said first positioning scheme, the relative location of said control points associated with one of said at least one region is limited by said minimum distance value.

41. The system of claim 35, where said first positioning scheme is a function of said second positioning scheme.

42. The system of claim 35, where said second positioning scheme comprises a resizing scheme which changes positions of regions based on the resizing of a canvas area.

43. A system for flexibly resizing an image comprising a vector graphics component, comprising:
    vector data storage for storing vector data comprising at least one control point, each control point corresponding to a location, said vector data representing said vector graphics component;
    gridline data storage storing gridline data dividing said vector graphics component into two or more slices, where each of said control points is associated with a corresponding one of said slices via an association, the association comprising one of location information between the slices and each of the control points, scaling information between the slices and each of the control points, and distance information between the slices and each of the control points;
    positioning scheme assigner assigning at least one of said slices to a first positioning scheme and at least one of said slices to a second positioning scheme;
    vector graphics recalculator resizing said vector graphics component where a new position for each control point associated with said slices assigned to said first positioning scheme is determined according to said first positioning scheme, and where a new position for each of said control points associated with said slices assigned to said second positioning scheme is determined according to said second positioning scheme; and
    a display device for displaying the resized vector graphics component.

44. The system of claim 43, where said first positioning scheme for a given slice comprises maintaining the locations of said control points associated with said given slice in the same relative location to each other.

45. The system of claim 43, where said first positioning scheme for a given slice comprises maintaining the locations of said control points associated with said given slice in the same relative location to each other in one dimension, and changing the relative locations of said control points associated with said given slice according to said second positioning scheme in a second dimension.

46. The system of claim 43, where said first positioning scheme for a given slice includes a maximum distance value, and where according to said first positioning scheme, the relative location of said control points associated with said given slice is limited by said maximum distance value.

47. The system of claim 43, where said first positioning scheme for a given slice includes a minimum distance value, and where according to said first positioning scheme, the relative location of said control points associated with said given slice is limited by said minimum distance value.

48. The system of claim 43, where said first positioning scheme is a function of said second positioning scheme.

49. The system of claim 43, where said second positioning scheme comprises a resizing scheme which changes positions of control points based on the resizing of a canvas area.

50. A system implemented at least in part by a computing device for flexibly resizing an image comprising a vector graphics component, comprising:
    vector data storage means for storing vector data comprising at least one control point, each control point corresponding to a location, said vector data representing said vector graphics component;
    pin data storage means for storing pin data regarding at least one pin, the pin data comprising, for each of said pins, a pin location and an association with at least one associated control point of the at least one control point, the association comprising one of location information between the pin and each of the at least one associated control point, scaling information between the pin and each of the at least one associated control point, and distance information between the pin and each of the at least one associated control point;
    vector graphics recalculator means for resizing said vector graphics component where a new position for each control point associated with one of said pins is determined according to a first positioning scheme, and where a new position for said associated pin location is determined according to a second positioning scheme; and
    a display device for displaying the resized vector graphics component.

51. A system implemented at least in part by a computing device for flexibly resizing an image comprising a vector graphics component, comprising:
    vector data storage means for storing vector data comprising at least one control point, each control point corresponding to a location, said vector data representing said vector graphics component;
    region data storage means for storing region data regarding at least one region, the region data comprising, for each of said regions, a region area, where each region is associated via an association with all of said control points which are located within said region area for the region, the association comprising one of location information between the region and each of the control points, scaling information between the region and each of the control points, and distance information between the region and each of the control points;
    vector graphics recalculator means for resizing said vector graphics component where a new position for each control point associated with one of said regions is determined according to a first positioning scheme, and where a new position for said region area is determined according to a second positioning scheme; and
    a display device for displaying the resized vector graphics component.

52. A system implemented at least in part by a computing device for flexibly resizing an image comprising a vector graphics component, comprising:

vector data storage means for storing vector data comprising at least one control point, each control point corresponding to a location, said vector data representing said vector graphics component;

gridline data storage means for storing gridline data dividing said vector graphics component into two or more slices, where each of said control points is associated with a corresponding one of said slices via an association, the association comprising one of location information between the slices and each of the control points, scaling information between the slices and each of the control points, and distance information between the slices and each of the control points;

positioning scheme assigner means for assigning at least one of said slices to a first positioning scheme and at least one of said slices to a second positioning scheme;

vector graphics recalculator means for resizing said vector graphics component where a new position for each control point associated with said slices assigned to said first positioning scheme is determined according to said first positioning scheme, and where a new position for each of said control points associated with said slices assigned to said second positioning scheme is determined according to said second positioning scheme; and a display device for displaying the resized vector graphics component.

* * * * *